United States Patent
Cowburn et al.

(10) Patent No.: US 12,100,158 B2
(45) Date of Patent: *Sep. 24, 2024

(54) WORLD-SPACE SEGMENTATION

(71) Applicant: Snap Inc., Santa Monica, CA (US)

(72) Inventors: Piers Cowburn, London (GB); David Li, London (GB); Isac Andreas Müller Sandvik, London (GB); Qi Pan, London (GB); Andrew Tristan Spek, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,353

(22) Filed: Jun. 2, 2023

(65) Prior Publication Data
US 2023/0326033 A1    Oct. 12, 2023

Related U.S. Application Data

(63) Continuation of application No. 17/835,538, filed on Jun. 8, 2022, now Pat. No. 11,721,025, which is a continuation of application No. 16/688,708, filed on Nov. 19, 2019, now Pat. No. 11,398,036.

(51) Int. Cl.
| | |
|---|---|
| *G06T 7/11* | (2017.01) |
| *G06T 7/12* | (2017.01) |
| *G06T 7/143* | (2017.01) |
| *G06T 7/174* | (2017.01) |
| *G06T 7/194* | (2017.01) |

(52) U.S. Cl.
CPC .............. *G06T 7/11* (2017.01); *G06T 7/12* (2017.01); *G06T 7/143* (2017.01); *G06T 7/174* (2017.01); *G06T 7/194* (2017.01); *G06T 2207/10016* (2013.01); *G06T 2207/10024* (2013.01); *G06T 2207/20081* (2013.01); *G06T 2207/20084* (2013.01)

(58) Field of Classification Search
CPC ... G06T 7/11; G06T 7/12; G06T 7/143; G06T 7/174; G06T 7/194; G06T 2207/10016; G06T 2207/10024; G06T 2207/20081; G06T 2207/20084
USPC ......................................................... 382/128
See application file for complete search history.

(56) References Cited

U.S. PATENT DOCUMENTS

| | | |
|---|---|---|
| 8,290,253 B1 | 10/2012 | Wang et al. |
| 8,358,691 B1 | 1/2013 | Wang et al. |
| 9,754,419 B2 | 9/2017 | Petrovskaya et al. |
| 10,475,250 B1 | 11/2019 | Huang et al. |
| 10,580,142 B1 * | 3/2020 | Hoffmann ............... G06T 7/194 |

(Continued)

FOREIGN PATENT DOCUMENTS

| | | |
|---|---|---|
| CN | 114730464 A | 7/2022 |
| WO | WO-2021102464 A1 | 5/2021 |

OTHER PUBLICATIONS

U.S. Appl. No. 16/688,708 U.S. Pat. No. 11,398,036, filed Nov. 19, 2019, World-Space Segmentation.

(Continued)

*Primary Examiner* — Jonathan S Lee
(74) *Attorney, Agent, or Firm* — Schwegman Lundberg & Woessner, P.A.

(57) ABSTRACT

Methods, systems, and devices for generating a persistent world-space ground (or floor) segmentation map (or "texture") for use in augmented or virtual reality 3D experiences.

20 Claims, 11 Drawing Sheets

(56) References Cited

U.S. PATENT DOCUMENTS

| | | | |
|---|---|---|---|
| 10,871,377 | B1 | 12/2020 | Yu et al. |
| 10,936,908 | B1 | 3/2021 | Ho et al. |
| 11,398,036 | B2 | 7/2022 | Cowburn et al. |
| 11,721,025 | B2 | 8/2023 | Cowburn et al. |
| 2010/0046830 | A1 | 2/2010 | Wang et al. |
| 2018/0066956 | A1 | 3/2018 | Kim et al. |
| 2021/0150719 | A1 | 5/2021 | Cowburn et al. |
| 2022/0301175 | A1 | 9/2022 | Cowburn et al. |

OTHER PUBLICATIONS

U.S. Appl. No. 17/835,538, filed Jun. 8, 2022, World-Space Segmentation.

"U.S. Appl. No. 16/688,708, Final Office Action mailed Feb. 15, 2022", 20 pgs.

"U.S. Appl. No. 16/688,708, Non Final Office Action mailed Jul. 22, 2021", 15 pgs.

"U.S. Appl. No. 16/688,708, Notice of Allowance mailed Apr. 7, 2022", 9 pgs.

"U.S. Appl. No. 16/688,708, Response filed Mar. 24, 2022 to Final Office Action mailed Feb. 15, 2022", 10 pgs.

"U.S. Appl. No. 16/688,708, Response filed Nov. 16, 2021 to Non Final Office Action mailed Jul. 22, 2021", 8 pgs.

"U.S. Appl. No. 17/835,538, Non Final Office Action mailed Jan. 6, 2023", 9 pgs.

"U.S. Appl. No. 17/835,538, Notice of Allowance mailed Mar. 23, 2023", 9 pgs.

"U.S. Appl. No. 17/835,538, Response filed Mar. 9, 2023 to Non Final Office Action mailed Jan. 6, 2023", 7 pgs.

"European Application Serial No. 20821575.6, Response to Communication pursuant to Rules 161 and 162 filed Dec. 14, 2022", 19 pgs.

"International Application Serial No. PCT/US2020/070798, International Preliminary Report on Patentability mailed Jun. 2, 2022", 10 pgs.

"International Application Serial No. PCT/US2020/070798, International Search Report mailed Feb. 18, 2021", 5 pgs.

"International Application Serial No. PCT/US2020/070798, Written Opinion mailed Feb. 18, 2021", 8 pgs.

Li, Jing, et al., "Building and optimization of 3D semantic map based on Lidar and camera fusion", Neurocomputing 409, (2020), 394-407.

Long, Chen, et al., "Context-Aware Mixed Reality: A Framework for Ubiquitous Interaction", arXiv.1803.05541v1 [cs.CV], [Online] Retrieved from the Internet: <URL: https://www.researchgate.net/publication/323796203_Context-Aware_Mixed_Reality_A_Framework_for_Ubiquitous_Interaction>, (Mar. 14, 2018), 11 pgs.

Meiqing, Wu, et al., "A framework for fast and robust visual odometry", IEEE Transactions on Intelligent Transportation Systems 18.12, (2017), 16 pgs.

Ming-Fang, Chang, et al., "Argoverse: 3d tracking and forecasting with rich maps", Proceedings of the IEEE/CVF conference on computer vision and pattern recognition, (2019), 10 pgs.

Patra, Suvam, et al., "A Joint 3D-2D based Method for Free Space Detection on Roads", arx1v.org, Cornell University Library, 201 Olin Library Cornell University Ithaca, NY 14853, (Nov. 6, 2017), 10 pgs.

Turkmen, Sercan, "Scene Understanding Through Semantic Image Segmentation in Augmented Reality", Master's Thesis—Degree Programme in Computer Science and Engineering, [Online] Retrieved from the Internet:<URL:https://core.ac.uk/download/pdf/344908431.pdf>, (Jun. 1, 2019), 64 pgs.

Wang, Rendong, et al., "A robust registration method for autonomous driving pose estimation in urban dynamic environment using LIDAR", Electronics 8.1:43, (2019), 21 pgs.

Wolf, Patrick, et al., "Behavior-Based Obstacle Detection in Off-Road Environments considering Data Quality", International Conference on Informatics in Control, Automation and Robotics. Springer, Cham, (2017).

"U.S. Appl. No. 17/835,538, Corrected Notice of Allowability mailed Jul. 6, 2023", 2 pgs.

* cited by examiner

WORLD-SPACE SEGMENTATION

CROSS-REFERENCE TO RELATED APPLICATION

This application is a continuation of U.S. patent application Ser. No. 17/835,538, filed Jun. 8, 2022, which is a continuation of U.S. patent application Ser. No. 16/688,708, filed Nov. 19, 2019, which is incorporated by reference herein in its entirety.

BACKGROUND

Recent advances in computation allow consumer electronics devices, such as smartphones and tablet devices, to generate and display ever more detailed mixed reality environments. Many mixed reality effects depend, for their utility, upon the correct identification of the category of object depicted in image frames captured by the device. In order to provide a stable basis for certain mixed reality effects, it is desirable to identify portions of each frame as "floor" or "ground", or "sky" for example.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
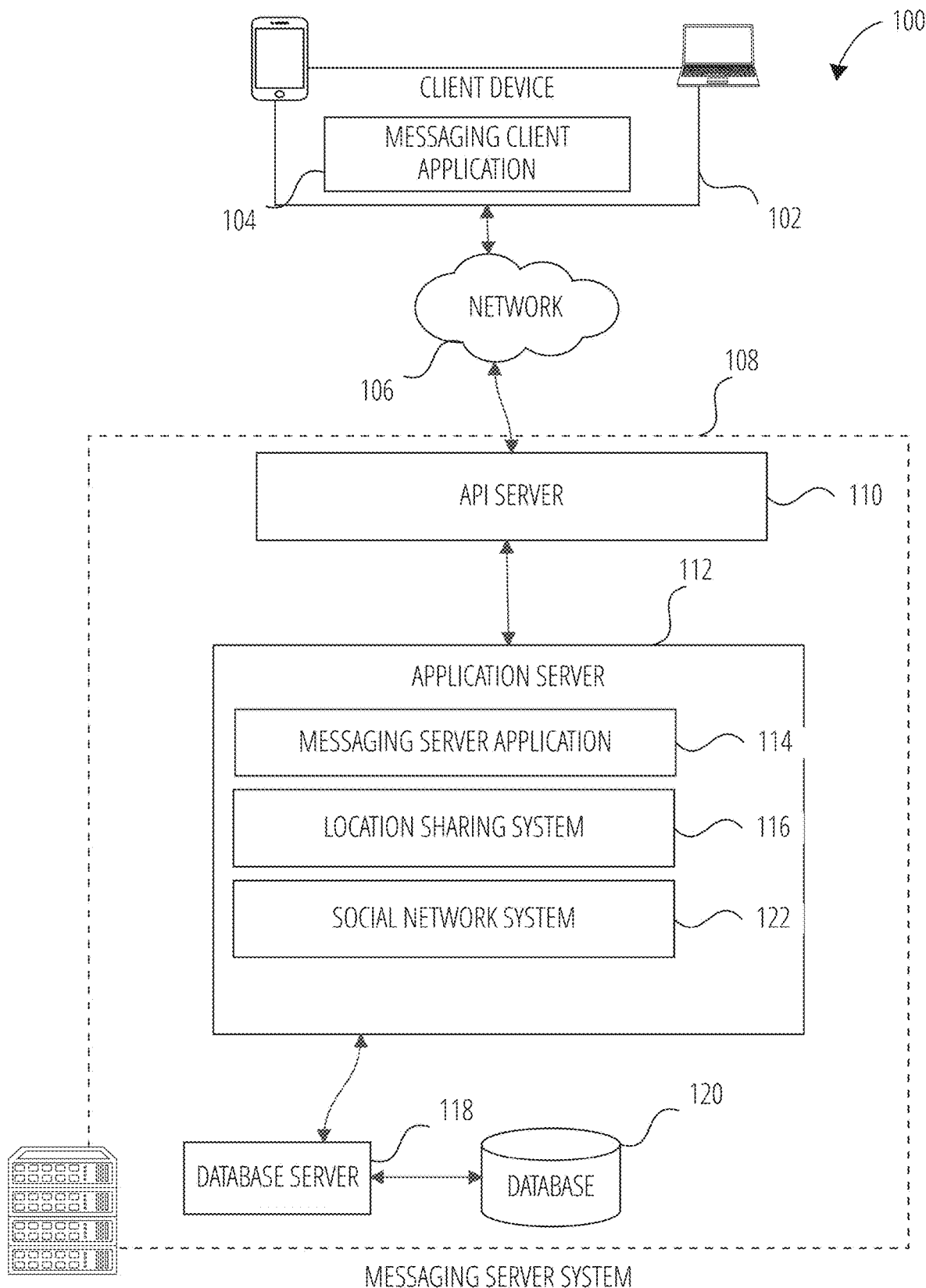
FIG. 1 is a diagrammatic representation of a networked environment in which the present disclosure may be deployed, in accordance with some example embodiments.

In many cases, it is convenient to attach an object classification to patches of pixels (or even to individual pixels) within each image frame; this process is referred to as segmentation of the image frame.

Many techniques for image segmentation are available. One technique that is becoming increasingly popular is semantic segmentation and uses neural networks to determine the likely association between a particular patch of pixels in an image frame and a label, such as "ground". The neural network is trained to identify the likely semantic classification of pixels (i.e. the label a human observer might give those pixels) in a captured image frame. The image is thus segmented into pixels that are of a particular classification and those that are not.

Semantic segmentation neural networks typically run in screen-space (i.e. the pixels to which the segmentation process is applied are precisely the pixels presented on the device display screen). Generating mixed reality video effects based on the output of conventional semantic segmentation processes is difficult because the effects are often sensitive to quite minor temporal instability in the image frames captured for display.

Conventional semantic segmentation neural networks are necessarily limited to the camera angle from which the image frame is captured: move the camera angle or relocate the camera relative to the depicted scene and the network must be applied all over again to achieve a useful segmentation.

Conventional computation of segments introduces a significant burden in terms of computation power that sets a high computational power requirement threshold, effectively preventing many devices (typically low-end or legacy) from executing desired effects.

Embodiments of the present disclosure address these and other issues.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure provide a method for generating a persistent world-space ground (or floor) segmentation map (or "texture") for use in augmented or virtual reality 3D experiences.

Known semantic segmentation neural networks run in screen-space and thus it is difficult to use them in conjunction with virtual 3D objects in real-time due to temporal instability and the inflexibility of only being able to sample images in screen-space. To address the temporal instability, it has been necessary to run the semantic segmentation neural network on each successive frame.

In some embodiments, mixed reality effects are applied to captured video frames in real-time. The utility of such effects may be severely compromised by the need to provide an accurate segmentation of successive video frames upon which to base the effect. Many capture devices may be unable to handle conventional segmentation at typical frame rates.

In some embodiments, features in captured video frames are entirely replaced by virtual data in a display however it maybe convenient to preserve aspects of the real world-space, for example the level of the world-space floor relative to the point of view of the image capture device may be preserved as the level of the virtual floor relative to the point of view of a virtual reality display.

Once image frame data is captured and mixed reality effects are applied, the resulting multimedia stream may be stored for later transmission to other devices, e.g. through a messaging system. Alternatively or additionally, the multimedia stream may be transmitted in real-time in accordance with a real-time communication protocol so that more than one communicatively connected device may participate in a shared mixed reality experience.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, texture maps, virtual effects and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, a location sharing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes a location sharing system 116 that is dedicated to performing various image processing operations, typically with respect to images or video received within the payload of a message at the messaging server application 114.

The application server 112 is communicatively coupled to a database server 118, which facilitates access to a database 120 in which is stored data associated with messages processed by the messaging server application 114.

Figure 2:
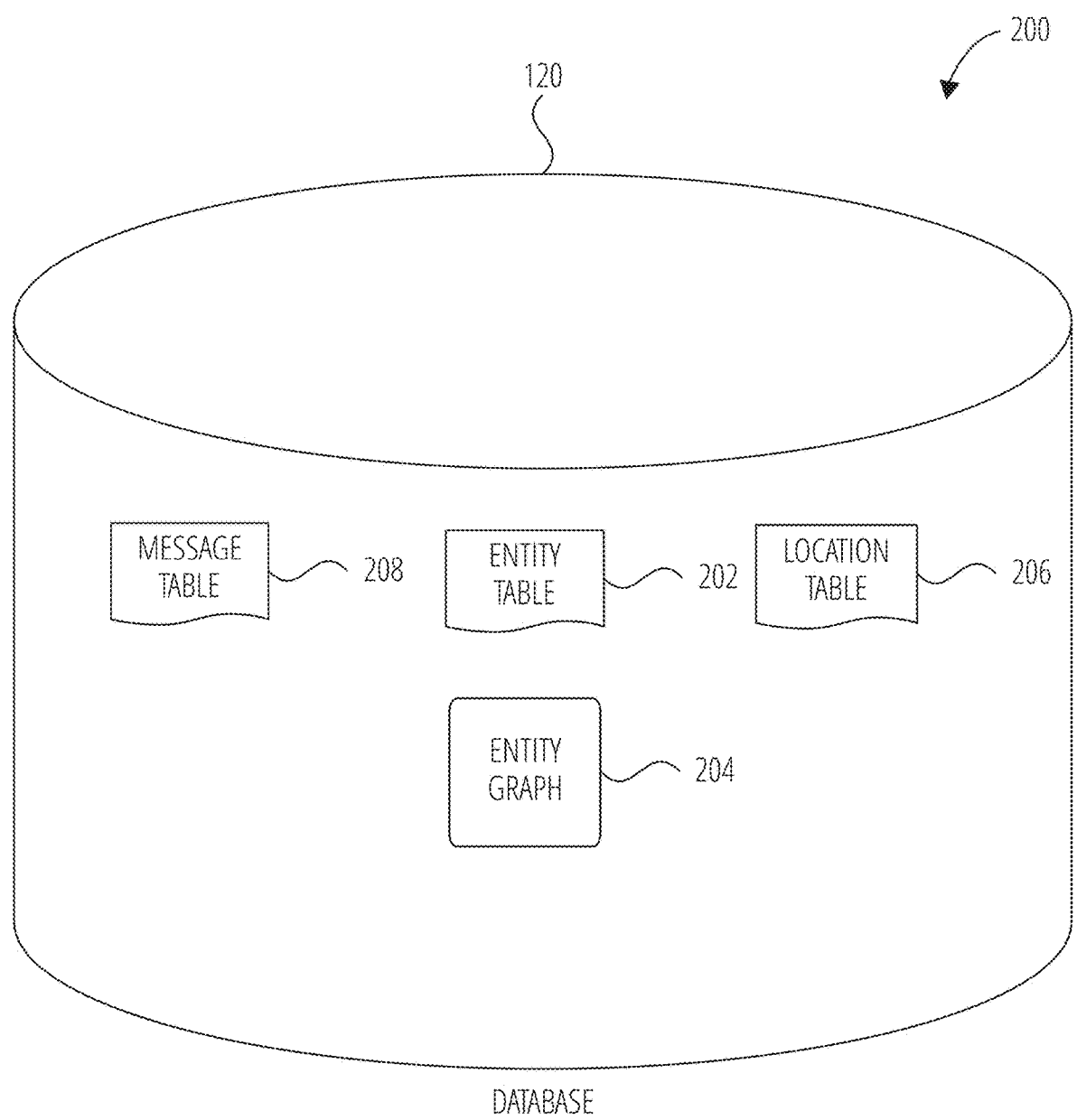
FIG. 2 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 204 (as shown in FIG. 2) within the database 120. Examples of functions and services supported by the social network system 122 include the identification of other users of the messaging system 100 with which a particular user has relationships or is "following", and also the identification of other entities and interests of a particular user.

Examples of functions and services supported by the social network system 122 also include generating a geographically-based graphical user interface (GUI). This interface may be referred to herein as a "map GUI," and may be used in conjunction with a social media application. In some embodiments, the map GUI may include representations of at least approximate respective positions of a user and a user's friends in a social network graph accessed by the social media application using avatars for each respective user.

The social network system 122 may receive user authorization to use, or refrain from using, the user's location information. In some embodiments, the social network system 122 may likewise opt to share or not share the user's location with others via the map GUI. In some cases, the user's avatar may be displayed to the user on the display screen of the user's computing device regardless of whether the user is sharing his or her location with other users.

In some embodiments, the location sharing for a user can be turned off or on by the user from within the map GUI (e.g., via a setting accessed by a menu presented in conjunction with the map GUI). In some embodiments, the social network system 122 may still present the user's avatar at the user's current location on the map GUI on the user's own device after the user turns off location sharing. This mode is referred to herein as "ghost mode." In some embodiments, the social network system 122 may present an icon on the display screen of the user's computing device to indicate the user's location is not currently being shared with others.

Note that the ghost mode functionality described herein may be distinguished from turning off location services on a mobile user device. Accordingly, in some embodiments when ghost mode is turned on, the device location services are still functioning, so that the user's location can still be determined.

In some embodiments, when the user turns on ghost mode after previously sharing his or her location, and the user's avatar being displayed on the map, the user's avatar disappears from other users' maps. In some embodiments, when in ghost mode, the user may still see anyone on the map who has chosen to share their location with the user. In some embodiments the user may also be provided the option of specifying who will get to see their location, and at what granularity. Examples of granularity options that may be selected by a user include a "precise" option (e.g., the user's location will be presented on the map as accurately as the location information from the user's computing device can provide); and a random location within a predetermined area (e.g. a city) based on the location information from the user's computing device.

In some embodiments, when the user (or group of users) selects the random location granularity option, the user's avatar will be shown in the map GUI within a predetermined distance of the user's current location (e.g., within the predetermined area such as a city the user is in), and the position of the user's avatar will not change if the user does not leave that area. In some embodiments, the user's avatar may include a label specifying the geographic area in which the user is located (e.g., "New York City").

In some embodiments, a user can select groups of other users to which his/her location will be displayed, and may in specify different display attributes for the different respective groups or for different respective individuals. In one example, audience options include: "Best Friends," "Friends," and "Custom" (which is an individual-level whitelist of people). In this example, if "Friends" are selected, all new people added to the user's friends list will automatically be able to see their location. If they are already sharing with the user, their avatars will appear on the user's map.

In some embodiments, when viewing the map GUI, the user is able to see the location of all his/her friends that have shared their location with the user on the map, each friend represented by their respective avatar. In some embodiments, if the friend does not have an avatar, the friend may be represented using a profile picture or a default icon displayed at the corresponding location for the friend.

In some embodiments, the user can select between friends on the map via a menu, such as a carousel. In some embodiments, selecting a particular friend automatically centers the map view on the avatar of that friend. Embodiments of the present disclosure may also allow the user to take a variety of actions with the user's friends from within the map GUI. For example, the system may allow the user to chat with the user's friends without leaving the map. In one particular example, the user may select a chat icon from a menu presented in conjunction with the map GUI to initiate a chat session.

FIG. 2 is a schematic diagram illustrating data structures 200 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 208. An entity table 202 stores entity data, including an entity graph 204. Entities for which records are maintained within the entity table 202 may include individuals (e.g., users), corporate entities, organizations, objects, places, events, etc. Regardless of type, any entity regarding which the messaging server system 108 stores data may be a recognized entity. Each entity is provided with a unique identifier, as well as an entity type identifier (not shown). The entity graph 204 furthermore stores information regarding relationships and associations between entities. Such relationships may be social, professional (e.g., work at a common corporation or organization) interested-based or activity-based, merely for example. A location table 206 stores historical and current location information of users (e.g., geolocation information determined by a GPS unit of the client device 102).

Figure 3:
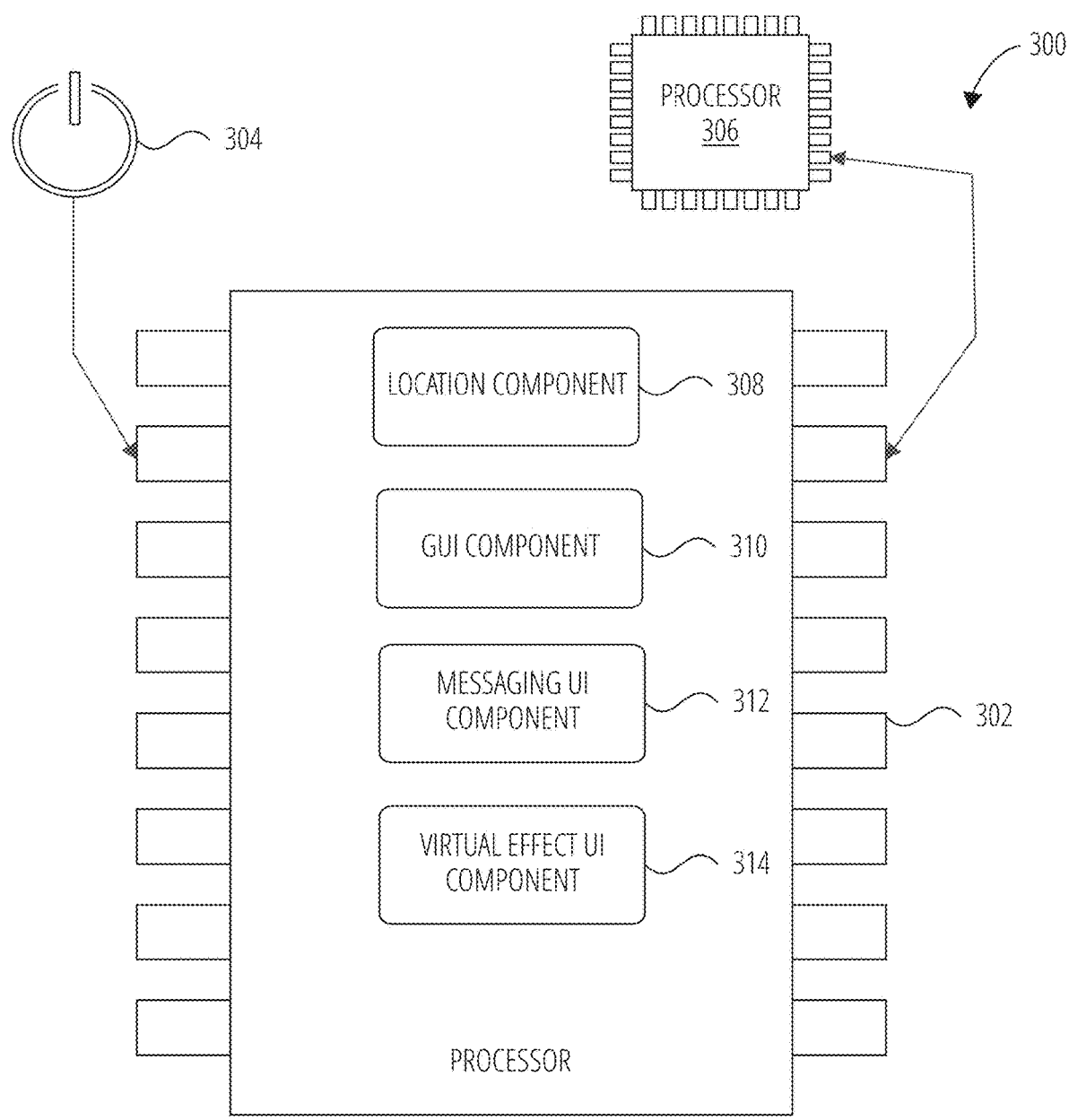
FIG. 3 is a diagrammatic representation of a processing environment, in accordance with some example embodiments.

Turning now to FIG. 3, there is shown a diagrammatic representation of a processing environment 300, which includes at least a processor 302 (e.g., a GPU, CPU or combination thereof). The processing environment 300 may be implemented in a user device, such as client device 102, arranged to capture video frames in real-time and to process and display augmented or virtual reality 3D experiences as described below.

The processor 302 is shown to be coupled to a power source 304, and to include (either permanently configured or temporarily instantiated) modules, namely a location component 308, a GUI component 310, a messaging UI component 312, and a virtual effect UI component 314. The location component 308 operationally determines location of users based on location information. The GUI component 310 operationally generates user interfaces and causes the user interfaces to be displayed on client devices. The messaging UI component 312 operationally generates user interfaces and causes the user interfaces to be displayed on client devices. As illustrated, the processor 302 may be communicatively coupled to another processor 306.

In certain embodiments, the virtual effect UI component 314 performs semantic segmentation upon image frames from an image capture device (i.e. a video stream), as described in detail below, and generates augmented or virtual reality 3D experiences for presentation in user interfaces generated by the GUI component 310. In certain embodiments, the virtual effect UI component 314 is implemented in a graphics processing unit (GPU). In certain embodiments, the processor 302 is, itself, a GPU.

Figure 4:
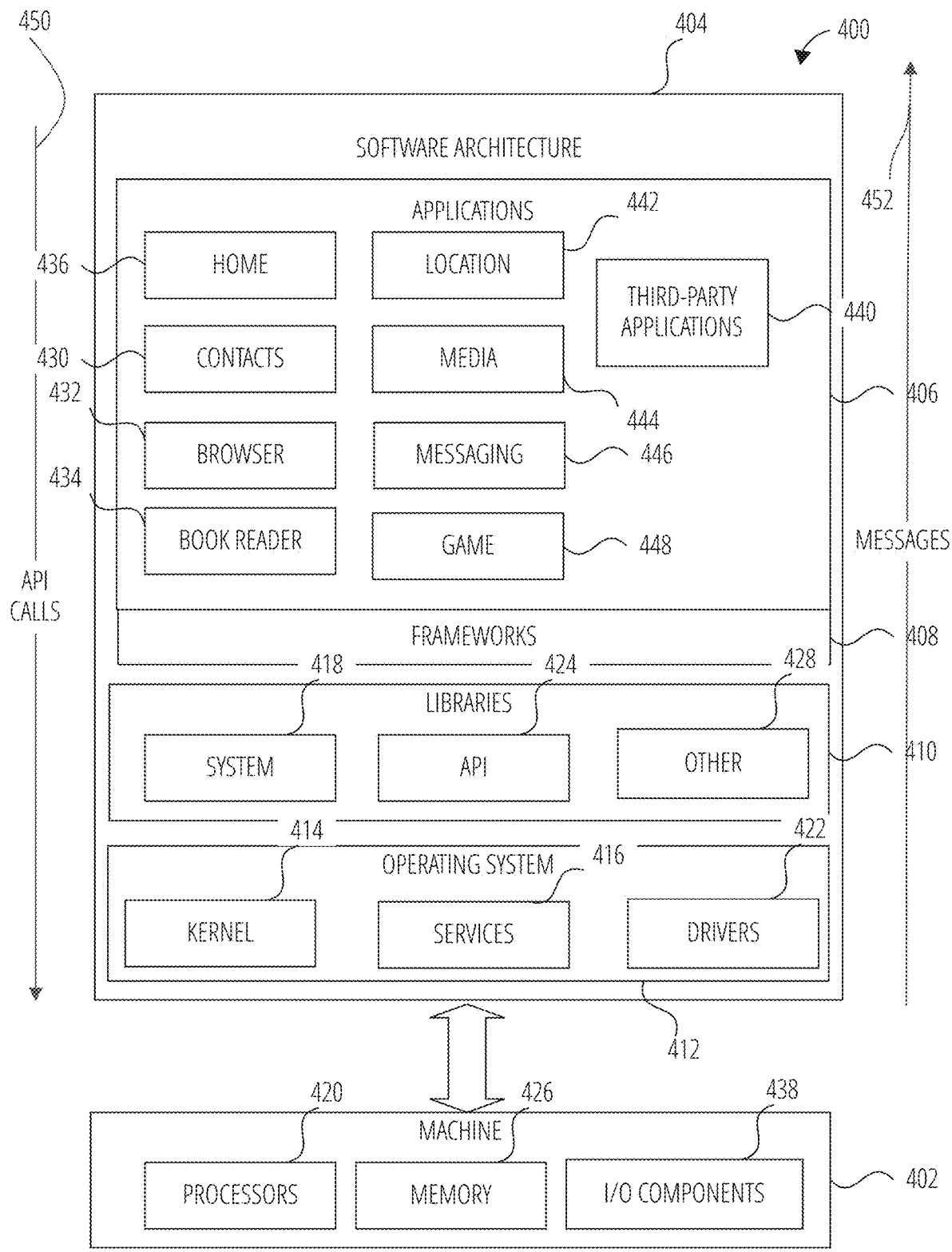
FIG. 4 is block diagram showing a software architecture within which the present disclosure may be implemented, in accordance with some example embodiments.

FIG. 4 is a block diagram 400 illustrating a software architecture 404, which can be installed on any one or more of the devices described herein. The software architecture 404 is supported by hardware such as a machine 402 that includes processors 420, memory 426, and I/O components 438. In this example, the software architecture 404 can be conceptualized as a stack of layers, where each layer provides a particular functionality. The software architecture 404 includes layers such as an operating system 412, libraries 410, frameworks 408, and applications 406. Operationally, the applications 406 invoke API calls 450 through the software stack and receive messages 452 in response to the API calls 450.

The operating system 412 manages hardware resources and provides common services. The operating system 412 includes, for example, a kernel 414, services 416, and drivers 422. The kernel 414 acts as an abstraction layer between the hardware and the other software layers. For example, the kernel 414 provides memory management, processor management (e.g., scheduling), component management, networking, and security settings, among other functionality. The services 416 can provide other common services for the other software layers. The drivers 422 are responsible for controlling or interfacing with the underlying hardware. For instance, the drivers 422 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 410 provide a low-level common infrastructure used by the applications 406. The libraries 410 can include system libraries 418 (e.g., C standard library) that provide functions such as memory allocation functions, string manipulation functions, mathematic functions, and the like. In addition, the libraries 410 can include API libraries 424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 410 can also include a wide variety of other libraries 428 to provide many other APIs to the applications 406.

The frameworks 408 provide a high-level common infrastructure that is used by the applications 406. For example, the frameworks 408 provide various graphical user interface (GUI) functions, high-level resource management, and high-level location services. The frameworks 408 can provide a broad spectrum of other APIs that can be used by the applications 406, some of which may be specific to a particular operating system or platform.

In an example embodiment, the applications 406 may include a home application 436, a contacts application 430, a browser application 432, a book reader application 434, a location application 442, a media application 444, a messaging application 446, a game application 448, and a broad assortment of other applications such as third-party applications 440.

The applications 406 are programs that execute functions defined in the programs. Various programming languages can be employed to create one or more of the applications 406, structured in a variety of manners, such as object-oriented programming languages (e.g., Objective-C, Java, or C++) or procedural programming languages (e.g., C or assembly language). In a specific example, the third-party applications 440 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 440 can invoke the API calls 450 provided by the operating system 412 to facilitate functionality described herein.

Figure 5:
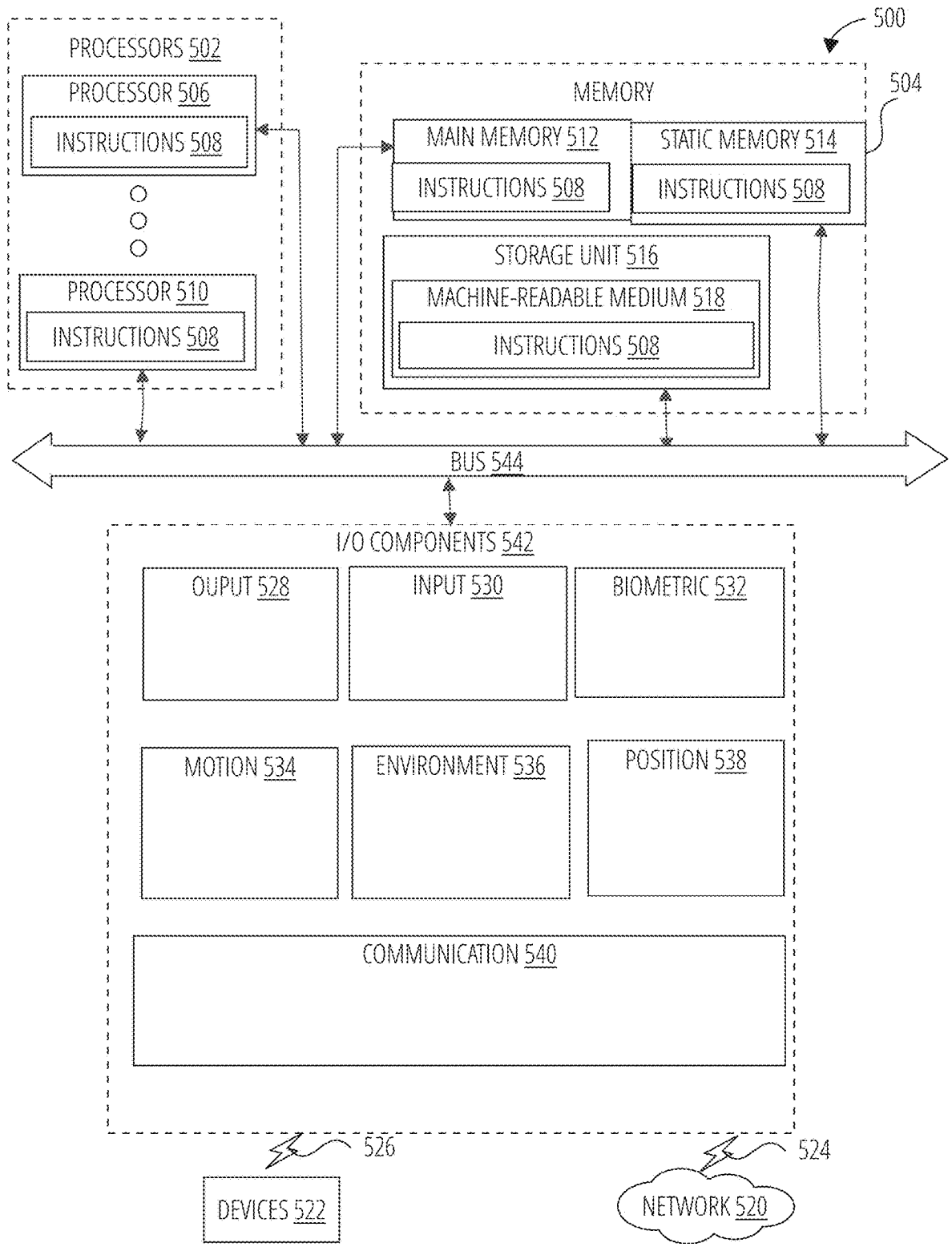
FIG. 5 is a diagrammatic representation of a machine, in the form of a computer system within which a set of instructions may be executed for causing the machine to perform any one or more of the methodologies discussed, in accordance with some example embodiments.

FIG. 5 is a diagrammatic representation of a machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein.

The machine 500 may include processors 502, memory 504, and I/O components 542, which may be configured to communicate with each other via a bus 544. In an example embodiment, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal processor (DSP), an ASIC, a Radio-Frequency Integrated Circuit (RFIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although FIG. 5 shows multiple processors 502, the machine 500 may include a single processor with a single core, a single processor with multiple cores (e.g., a multi-core processor), multiple processors with a single core, multiple processors with multiples cores, or any combination thereof. The processors 502 may form a processing environment as illustrated in FIG. 3.

The memory 504 includes a main memory 512, a static memory 514, and a storage unit 516, both accessible to the processors 502 via the bus 544. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 within the storage unit 516, within at least one of the processors 502 (e.g., within the processor's cache memory), or any suitable combination thereof, during execution thereof by the machine 500.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones may include a touch input device or other such input mechanisms, while a headless server machine will likely not include such a touch input device. It will be appreciated that the I/O components 542 may include many other components that are not shown in FIG. 5. In various example embodiments, the I/O components 542 may include output components 528 and input components 530. The output components 528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), video input components (e.g. a camera or other image capture device) and the like.

In further example embodiments, the I/O components 542 may include biometric components 532, motion components 534, environmental components 536, or position components 538, among a wide array of other components. For example, the biometric components 532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 include acceleration sensor components (e.g., accelerometer), gravitation sensor components, rotation sensor components (e.g., gyroscope), and so forth. The environmental components 536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 further include communication components 540 operable to couple the machine 500 to a network 520 or devices 522 via a coupling 524 and a coupling 526, respectively. For example, the communication components 540 may include a network interface component or another suitable device to interface with the network 520. In further examples, the communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geolocation, location via Wi-Fi® signal triangulation, location via detecting an NFC beacon signal that may indicate a particular location, and so forth.

The various memories (e.g., memory 504, main memory 512, static memory 514, and/or memory of the processors 502) and/or storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed embodiments.

The instructions 508 may be transmitted or received over the network 520, using a transmission medium, via a network interface device (e.g., a network interface component included in the communication components 540) and using any one of a number of well-known transfer protocols (e.g., hypertext transfer protocol (HTTP)). Similarly, the instructions 508 may be transmitted or received using a transmission medium via the coupling 526 (e.g., a peer-to-peer coupling) to the devices 522.

Figure 6:
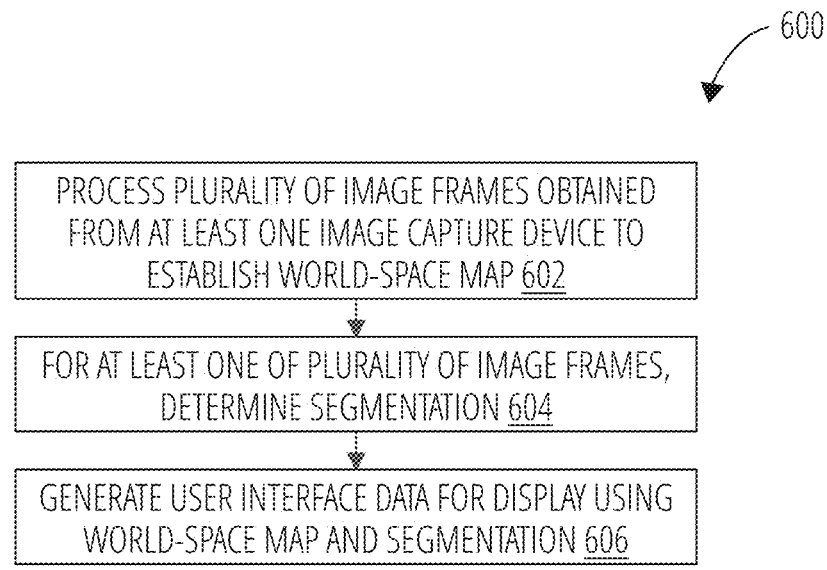
FIG. 6 illustrates the main operational blocks of a routine for performing semantic segmentation of image frames in accordance with some example embodiments.

FIG. 6 illustrates the main operational blocks in a routine 600 for performing semantic segmentation of image frames for use in the generation of augmented or virtual reality 3D experiences. The routine 600 may be performed by one or more processors of a client device, such as those illustrated in FIG. 3 or FIG. 5.

In block 602, the processor processes a plurality of image frames obtained from at least one image capture device to establish a world-space map.

It is noted that image frames may the output of more than one image capture device. In certain cases, the plural image capture device may be integral with the same client device (e.g. forward and rear cameras, plural cameras provided for depth of field and/or three dimensional image capture) or they may be provided in respective distinct client devices and communicated to the processor (e.g. via a communications network or a messaging system such as that illustrated in FIG. 1).

In block 604, the processor determines a segmentation for at least one of the plurality of image frames.

In block 606, item 600 generates user interface data for display using the world-space map and the segmentation.

Prior to determining the segmentation at block 604, the processor may optionally initialize a segmentation texture for storing segmentation information. The segmentation determined at block 604 is then stored in the initialized segmentation texture. The segmentation information may, for example, relate to a fixed area around the at least one image capture device.

In certain embodiments, the establishment of a world-space map at block 602 is performed by applying a surface tracker to the plurality of image frames. The surface tracker is a software component capable of tracking a gravity-aligned plane. Examples of suitable surface tracker components include full simultaneous localization and mapping (SLAM) systems, such as ARKit and ARCore, but are not limited to such systems. For the purposes of the tracking of simple surfaces such as the ground (or floor), the surface tracker need only be arranged to track a gravity-aligned plane: the client device would require an accelerometer or some other equivalent component to confirm a direction of gravitational force. In certain embodiments (such as those where it is desired to segment image frames into "ground/floor" and "not ground/floor") the surface tracker components may simply be a plane tracker, such simple surface trackers may be termed "lightweight trackers". As a result, the present disclosure places lower requirements on the specifications of the accelerometers and gyroscopes used by client devices to monitor movement and orientation of the client device (e.g. inertial measurement units, IMUs) than techniques that require full SLAM.

To accurately generate the world-space map, the surface tracker requires more than one image frame (in addition to accelerometer/gyroscope data for gravity alignment).

In certain embodiments, determining the segmentation (block 604) comprises obtaining segmentation in screen-space from the at least one of the plurality of image frames; projecting the screen-space segmentation into world-space; and integrating the projected segmentation into the world-space map using a temporal filter (see FIG. 8 below).

In certain embodiments, segmentation is obtained in screen-space by executing a semantic segmentation neural network with the at least one of the plurality of image frames as input. Notably, the segmentation does not need to be obtained for every image frame. Thus, the determination of segmentation may be iteratively repeated for a subset of the plurality of image frames.

In certain embodiments, the method further comprises: determining whether a sufficiency condition is met; and, if the sufficiency condition is met, ceasing execution of the semantic segmentation neural network and continuing to use the determined segmentation in subsequent iterations.

An exemplary condition for ceasing processing might be the requirement that a variance for a pixel is less than a variance threshold, where "variance" is a metric of the average difference in probability that that pixel is correctly labelled.

In certain embodiments, the method may be arranged to be spatially selective about the region or regions of an image frame in which to cease execution of the semantic segmentation neural network.

Determining the segmentation may further comprise storing the screen-space segmentation in a segmentation texture.

Figure 7:
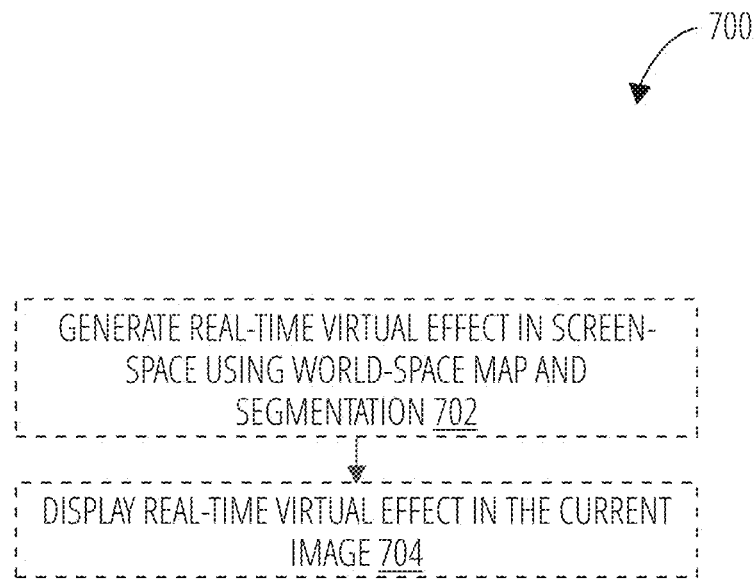
FIG. 7 illustrates the main operational blocks in implementing a task of generating user interface data for display in accordance with some example embodiments.

FIG. 7 illustrates the main operational blocks in implementing the task of generating user interface data for display (as in block 606 of FIG. 6).

In block 702, the processor optionally generates a real-time virtual effect in screen-space using the world-space map and the segmentation.

In block 704, the processor optionally then displays the real-time virtual effect in the current image.

Display of an effect in the current image may include superposing the virtual effect over the current image or replacing pixels of the current image by alternative pixels or shaders from the real-time virtual effect.

Figure 8:
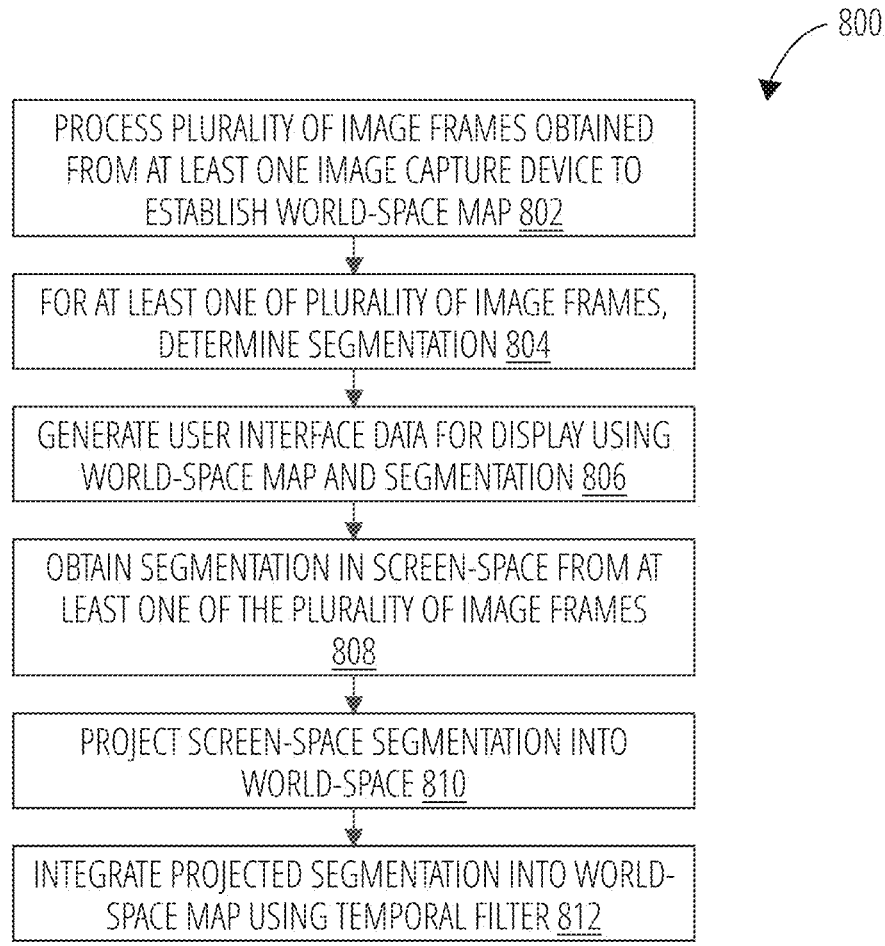
FIG. 8 illustrates the main operational blocks in implementing the task of determining the segmentation in accordance with some example embodiments.

FIG. 8 illustrates the main operational blocks in implementing the task of determining the segmentation (as in block 604 of FIG. 6).

In block 802, the processor processes a plurality of image frames obtained from at least one image capture device to establish a world-space map. In block 804, the processor determines a segmentation for at least one of the plurality of image frames. In block 806, the processor generates user interface data for display using the world-space map and the segmentation. In block 808, the processor obtains segmentation in screen-space from the at least one of the plurality of image frames. In block 810, the processor projects the screen-space segmentation into world-space. In block 812, the processor integrates the projected segmentation into the world-space map using a temporal filter.

In certain embodiments, the screen-space segmentation is projected into world-space by storing the projected segmentation in a temporary world-space segmentation texture and then integrating the temporary world-space segmentation texture from this frame into the world-space map. While the use of a temporary world-space segmentation texture provides an effective data structure in client devices where processing capacity is at a premium over storage (and retrieval) latency, the use of a temporary world-space segmentation texture is optional in client devices having more advanced processing facilities.

In certain embodiments, the segmentation texture is a two-dimensional data structure, each entry in the segmentation texture including at least one value indicating a likelihood that a corresponding pixel in the image frame fulfils a segmentation criterion. In the case of ground/floor segmentation, the segmentation texture being a ground/floor segmentation texture, the segmentation criterion may be a criterion for assigning a pixel to a ground/floor object class. The ground/floor segmentation texture is essentially a 2D map with respective "color values" that indicate "floor" or "not floor" segmentation.

The temporal filter may be either an infinite impulse response (IIR) filter or a finite impulse response (FIR) filter.

As noted in the discussion of FIG. 3, a processor implementing the above method may be a graphics processing unit (GPU). Significantly, the method described above comprises a series of highly parallelisable steps and can be implemented as pixel/fragment shaders; tasks for which GPUs are well-suited.

In certain embodiments, the method further comprises running at least one world-space post-processing filter. Post-processing may be applied the world-space map as this gives visually stable results in the resulting display of a real-time virtual effect. Examples of world-space post-processing filters include erosion and dilation filters.

Figure 9:
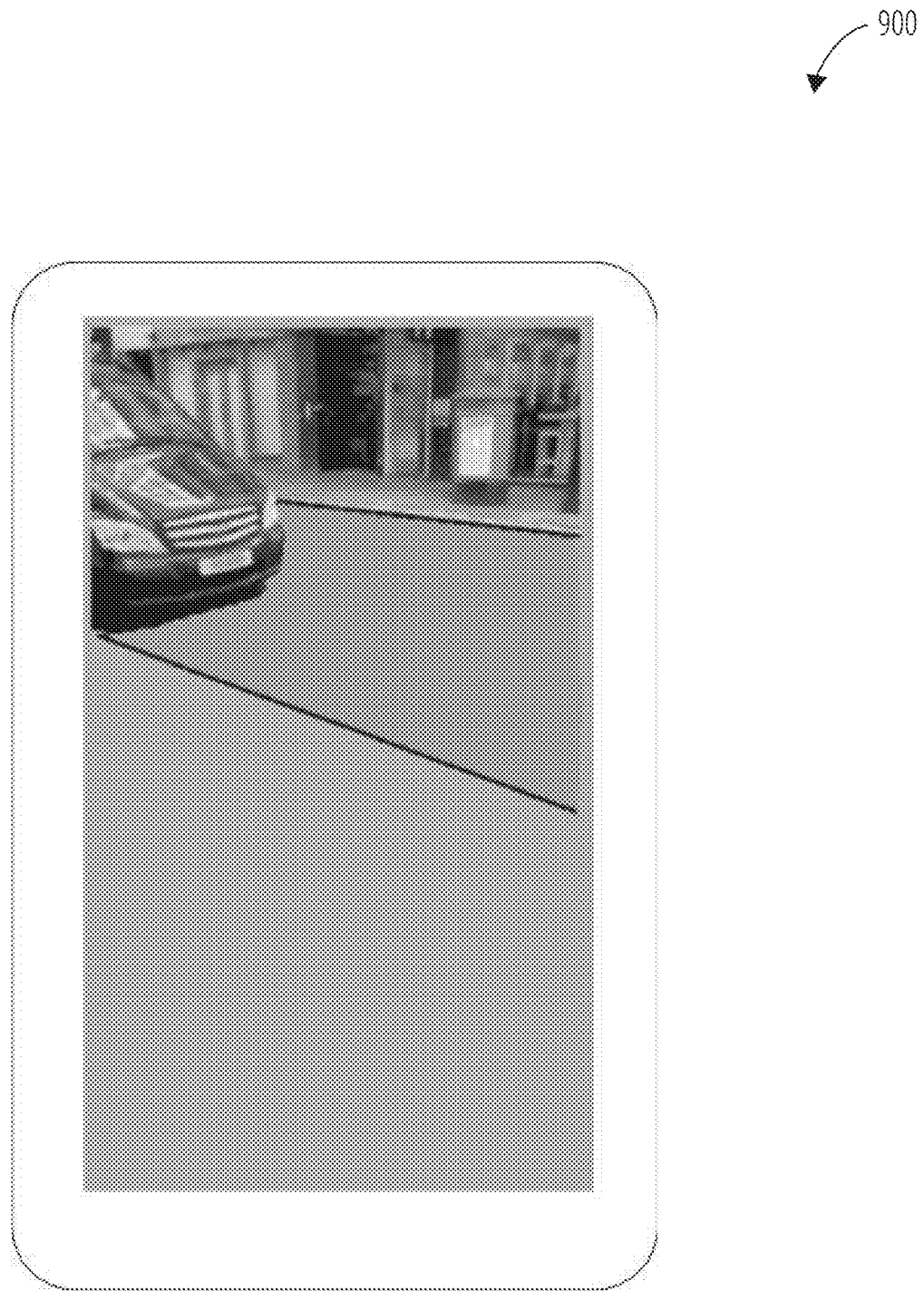
FIG. 9 illustrates a "ground truth" street scene 900 in accordance with one exemplary embodiment.

In one use case, the segmentation method described above is used to replace, in a generated UI video display, pixels depicting a static floor by a virtual modified floor effect. FIG. 9 illustrates a "ground truth" street scene with a parked vehicle and surrounding stores.

Figure 10:
FIG. 10 illustrates the application of a virtual modified ground effect to the street scene of FIG. 9. in which the road surface is textured to resemble lava 1000 in accordance with one embodiment.

In FIG. 10, the segmentation method described above is used to replace pixels depicting the static road surface (in FIG. 9) by a virtual modified ground effect. The ground in the generated video display may be replaced by an effect in which the road surface is textured to resemble lava. The parked vehicle and surrounding stores remain unchanged, by contrast.

Figure 11:
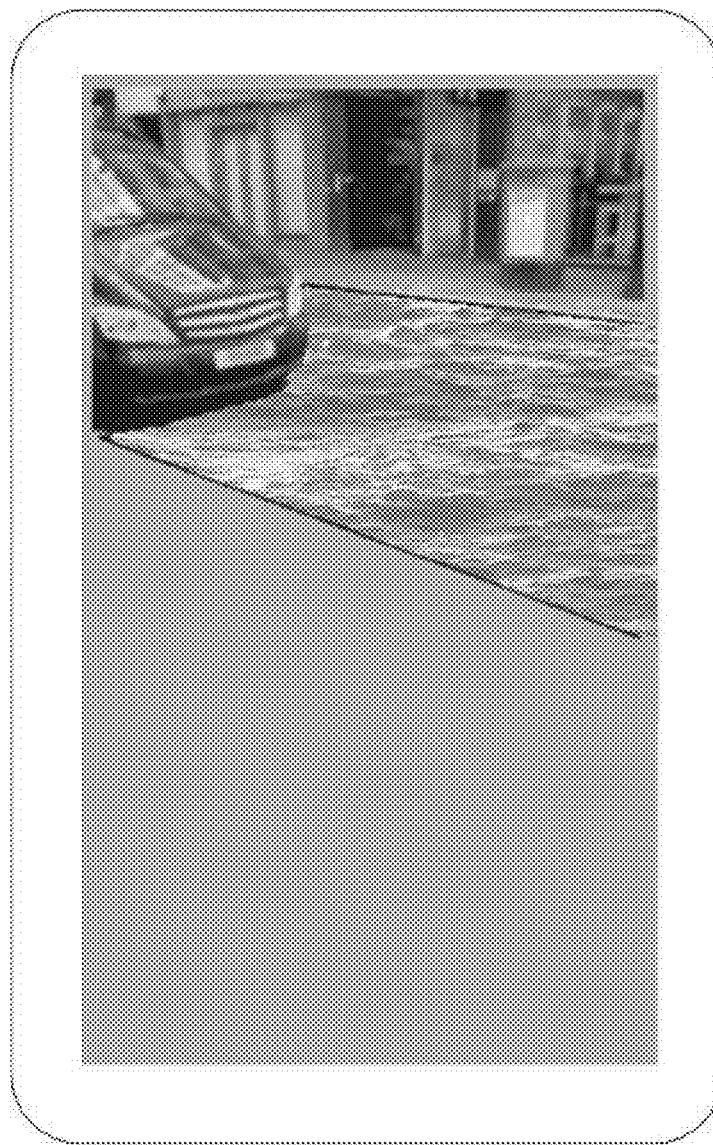
FIG. 11 illustrates the application of a virtual modified ground effect to the street scene of FIG. 9. in which the height of the floor is dynamically changed to depict an undulating water surface 1100 in accordance with a further embodiment.

The road surface in FIG. 9 may alternatively be replaced by an effect in which the height of the floor is dynamically changed to depict an undulating water surface (as in FIG. 11).

In a further use case, the segmentation method described above may be used to generate a floor plan of a room. By panning the image capture device around a room to generate a group of image frames that comprehensively span the entire room (including furniture, fixtures and fittings), the routine for segmenting the image frames allows the quick identification of exposed floor space and the resulting world-space model may be used in architectural, structural survey and/or interior decoration applications.

In a similar use case, the segmentation method described above may be used to generate a map of an outdoor region, thereby quickly fixing where buildings are located (by virtue of their footprint in the world-space map of the ground segment).

The generated world-space map may further be used to assist virtual agents navigating a mixed reality environment based on real-time video capture, e.g. AI characters/"sprites" being displayed as walking around the floor in an AR game. Equally, information derived from the generated world-space map may be used to model the presence of walls and other obstacles so that virtual agents being modelled as moving on the floor can avoid (or cause) collisions with obstacles in that modelled behavior. Thus, for example, a virtual remote-controlled car may be "driven" around a room (in augmented reality) and collide with walls and other objects.

The generated world-space map may further be compared with a pre-existing location map (e.g. a known floor plan or a known street map) to assist in accurately orienting the user with respect to the pre-existing map. This may prove especially helpful in indoor or outdoor areas (downtown city blocks, malls, etc.) where alternative positioning techniques (such as GPS, Cell-ID etc.) are inadequate. The pre-existing location map and the position on that map inferred from the comparison may be presented in a map GUI (such as that discussed above).

In the above discussion, the term screen-space is intended to include the near-equivalent case of case of "camera-space". Camera-space refers to the data obtained in any given image frame by an image capture device, which might be cropped for display to give screen-space.

In certain embodiments, the semantic segmentation neural network may be used to segment image frames in screen-space into more than two labelled categories. For example, the image frame may be segmented into "floor/ground", "road marking", as well as "neither floor nor road marking". Different real-time virtual effects may be generated for each labelled category.

In certain use cases, the segmentation method described above is used to identify unclassified portions of the world-space map, e.g. portions that are not classified as "floor/ground". The unclassified portions of the image frame may in some cases be replaced, in a generated UI video display, e.g. by a virtual modified "wall" effect—so that a virtual wall may be imposed in the place of an obstacle on the floor, and virtual objects may be occluded as they are rendered moving "behind" the virtual wall. This may be achieved by virtually extrapolating a vertical stack of pixels from pixels on the ground plane that are marked as non-floor (this may conveniently be an infinite stack) and using that generated virtual surface as an occluder when rendering other virtual objects in the generated UI video display.

In certain embodiments, a messaging system (such as that outlined in FIG. 1) may be used to communicate information about a world-space map including the projected segmentation integrated into the world-space map so that more than one client device may access (and contribute to) a shared world-view map (and segmentation texture).

In certain embodiments, the segmentation method described above may be adapted to identify that movable objects (such as people, vehicles, etc.) are temporarily occluding the floor. Sufficient image frames may be processed to track the "true" ground and to derive a "sanitized" world-space map that effectively extracts the temporary footprint of such movable objects.

Similarly, certain embodiments facilitate the recognition and tracking of regions of image frames that share similar color value (sometimes referred to as "blobs"). The Segmentation method above may be used to label blobs and a visual effect may be generated in which the "blob" segmentation may be removed: this may be used to anonymize or obscure features in a world-space map.

What is claimed is:

1. A computer-implemented method comprising:
determining a segmentation for a first image frame of a plurality of image frames;
iteratively repeating the determination of the segmentation for each image frame following the first image frame until determining a sufficiency condition is met;
based on determining that the sufficiency condition is met, ceasing execution of determination of segmentation of each frame following the first image frame and continuing to use a last determined segmentation in subsequent iterations of image frames in the plurality of image frames; and
generating user interface data for display using the segmentation.

2. The computer-implemented method of claim 1, wherein generating user interface data for display comprises:
generating a real-time virtual effect in screen-space using a world-space map and the segmentation; and
displaying the real-time virtual effect in a current image.

3. The computer-implemented method of claim 2, wherein the world-space map is established by applying a surface tracker to the plurality of image frames.

4. The computer-implemented method of claim 1 further comprising:
    initializing a segmentation texture for storing segmentation information prior to determining the segmentation.

5. The computer-implemented method of claim 4, wherein the segmentation information relates to a fixed area around at least one image capture device.

6. The computer-implemented method of claim 5, wherein the segmentation texture is a two-dimensional data structure, each entry in the segmentation texture including at least one value indicating a likelihood that a corresponding pixel in an image frame fulfils a segmentation criterion.

7. The computer-implemented method of claim 6, wherein the segmentation texture is a ground/floor segmentation texture and the segmentation criterion is a criterion for assigning a pixel to a ground/floor object class.

8. The computer-implemented method of claim 1, wherein determining the segmentation comprises:
    obtaining segmentation in screen-space from at least one image frame of the plurality of image frames;
    projecting the screen-space segmentation into world-space; and
    integrating the projected screen-space segmentation into a world-space map using a temporal filter.

9. The computer-implemented method of claim 8, wherein segmentation is obtained in screen space by executing a semantic segmentation neural network with the at least one image frame of the plurality of image frames as input.

10. The computer-implemented method of claim 8, wherein determining the segmentation further comprises:
    storing the screen-space segmentation in a segmentation texture.

11. The computer-implemented method of claim 8, wherein the screen-space segmentation is projected into world-space by storing the projected screen-space segmentation in a temporary world-space segmentation texture and then integrating the temporary world-space segmentation texture from this frame into the world-space map.

12. The computer-implemented method of claim 8, wherein the temporal filter is an infinite impulse response (IIR) filter or a finite impulse response (FIR) filter.

13. The computer-implemented method of claim 1, further comprising:
    running at least one world-space post-processing filter.

14. The computer-implemented method of claim 1, wherein the sufficiency condition is a requirement that a variance for a pixel is less than a variance threshold.

15. The computer-implemented method of claim 1, wherein the plurality of image frames are obtained from a forward and rear camera of at least one image capture device.

16. A computing apparatus, the computing apparatus comprising:
    a processor; and
    a memory storing instructions that, when executed by the processor, configure the computing apparatus to perform operations comprising:
        determining a segmentation for a first image frame of a plurality of image frames;
        iteratively repeating the determination of the segmentation for each image frame following the first image frame until determining a sufficiency condition is met;
        based on determining that the sufficiency condition is met, ceasing execution of determination of segmentation of each frame following the first image frame and continuing to use a last determined segmentation in subsequent iterations of image frames in the plurality of image frames; and
        generating user interface data for display using the segmentation.

17. The computing apparatus of claim 16, wherein generating user interface data for display comprises:
    generating a real-time virtual effect in screen-space using a world-space map and the segmentation; and
    displaying the real-time virtual effect in a current image.

18. The computing apparatus of claim 16, the operations further comprising:
    initializing a segmentation texture for storing segmentation information prior to determining the segmentation, wherein the segmentation information relates to a fixed area around at least one image capture device.

19. The computing apparatus of claim 16, the operations further comprising:
    initializing a segmentation texture for storing segmentation information prior to determining the segmentation; and
    wherein the segmentation texture is a two-dimensional data structure, each entry in the segmentation texture including at least one value indicating a likelihood that a corresponding pixel in an image frame fulfils a segmentation criterion, or
    wherein the segmentation texture is a ground/floor segmentation texture and the segmentation criterion is a criterion for assigning a pixel to a ground/floor object class.

20. A non-transitory computer-readable storage medium, the computer-readable storage medium including instructions that when executed by a computer, cause the computer to perform operations comprising:
    determining a segmentation for a first image frame of a plurality of image frames;
    iteratively repeating the determination of the segmentation for each image frame following the first image frame until determining a sufficiency condition is met;
    based on determining that the sufficiency condition is met, ceasing execution of determination of segmentation of each frame following the first image frame and continuing to use a last determined segmentation in subsequent iterations of image frames in the plurality of image frames; and
    generating user interface data for display using the segmentation.

* * * * *